(12) United States Patent
Duplys

(10) Patent No.: US 11,979,269 B2
(45) Date of Patent: May 7, 2024

(54) DETECTING ANOMALOUS COMMUNICATIONS

(71) Applicant: Robert Bosch GmbH, Stuttgart (DE)

(72) Inventor: Paulius Duplys, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 17/894,312

(22) Filed: Aug. 24, 2022

(65) Prior Publication Data

US 2023/0090242 A1   Mar. 23, 2023

(30) Foreign Application Priority Data

Sep. 17, 2021   (DE) ...................... 10 2021 210 323.5

(51) Int. Cl.
*H04L 41/0233*   (2022.01)
*H04L 12/40*   (2006.01)

(52) U.S. Cl.
CPC .......... *H04L 41/0233* (2013.01); *H04L 12/40* (2013.01); *H04L 2012/40215* (2013.01)

(58) Field of Classification Search
None
See application file for complete search history.

(56) References Cited

U.S. PATENT DOCUMENTS

| | | | |
|---|---|---|---|
| 10,873,601 B1* | 12/2020 | Stickle | H04L 63/1416 |
| 2018/0316655 A1* | 11/2018 | Mani | H04L 61/4511 |
| 2020/0053123 A1* | 2/2020 | Pliskin | H04L 63/10 |

\* cited by examiner

*Primary Examiner* — Angela Nguyen
(74) *Attorney, Agent, or Firm* — NORTON ROSE FULBRIGHT US LLP; Gerard A. Messina

(57) ABSTRACT

A computer-implemented method for detecting anomalous communications in a service oriented communication system. The method includes providing at least one decoy service, hosted by a decoy server communicably coupled to the service oriented communication system, wherein the at least one decoy service is addressable using a corresponding decoy service identifier; detecting, at the decoy server, a request to consume at least one instance of the at least one decoy service, wherein the request originates from a client communicably coupled to the decoy server via the service oriented communication system; and performing, at the decoy server, a response to the request to consume the at least one instance of the at least one decoy service.

14 Claims, 5 Drawing Sheets

DETECTING ANOMALOUS COMMUNICATIONS

CROSS REFERENCE

The present application claims the benefit under 35 U.S.C. § 119 of German Patent Application No. DE 10 2021 210 323.5 filed on Sep. 17, 2021, which is expressly incorporated herein by reference in its entirety.

FIELD

The present specification relates to a computer-implemented method for detecting anomalous communications in a service oriented communication system, and an associated apparatus, vehicle, computer program element, and computer readable medium.

BACKGROUND INFORMATION

Service-oriented communication systems are increasingly being used for data communication within vehicles. CAN-based communication systems are signal-based, and statically defined during a development phase. A service-oriented communication system can be dynamically adapted during operational deployment. Interactions between instances of the service-oriented communication system, such as various Electronic Control Units (ECUs) can be mapped dynamically as services offered by the ECUs.

For example, an entity in the service-oriented communication system can publish a service, and in so doing, offer it to other entities that are in logical communication with the service-oriented communication system. Furthermore, an entity in the service-oriented communication system can subscribe to a service offered by another entity in the service-oriented communication system. By publishing, and/or subscribing, to services offered by entities in logical communication with the service-oriented communication system, ECUs that are not comprised in the hardware of a vehicle (for example, ECUs which are accessible via a communications network) can be integrated, perhaps temporarily, into the service-oriented communication system. For example, a smartphone of a vehicle user could be integrated into the service-oriented communication system, enabling the user to play music via the vehicle's integrated audio system.

One version of a service-oriented communication system is the "SOME/IP" standard ("Scalable Service-Oriented Middleware over IP"), intended to provide service-oriented communication in vehicles. The middleware (also named as an intermediate application layer, or a service layer) is arranged on levels 5 to 7 of the standard ISO/OSI communication layer model. SOME/IP uses one or both of TCP or UDP as the underlying transport protocol. SOME/IP enables applications logically connected to the service oriented communication system to communicate with each other, without knowing which specific instance, and/or ECU, the respective application is running on. "SOME/IP" has been incorporated into AUTOSAR™ since AUTOSAR version 4.

In addition to enabling the publishing or, and subscription to, services, "SOME/IP" facilitates service discovery. For example, instances in the service-oriented communication system can find offered services, and obtain endpoint identifiers, port numbers, or IP addresses associated with the offered services. In addition, "SOME/IP" offers functionality implementing "Remote Procedure Calls" (RPCs). In a RPC, an instance of the service-oriented communication system can call a function on another instance (such as a remote function or procedure) in such a way that the function is executed on the other instance, and any return values of the function are transmitted back to the calling instance via the service-oriented communication system.

The increasing complexity and interconnectivity of modern vehicles leads to an ever-increasing attack surface for possible intrusion into one or more of the ECUs that are logically connected via the service-oriented communication system. The security provision of service-oriented communication systems may, therefore, be further improved.

SUMMARY

According to a first aspect, the present invention provides a computer-implemented method for detecting anomalous communications in a service oriented communication system. According to an example embodiment of the present invention, the method comprises:

providing at least one decoy service, hosted by a decoy server communicably coupled to the service oriented communication system, wherein the at least one decoy service is addressable using a corresponding decoy service identifier;

detecting, at the decoy server, a request to consume at least one instance of the at least one decoy service, wherein the request originates from a client communicably coupled to the decoy server via the service oriented communication system; and performing, at the decoy server, a response to the request to consume the at least one instance of the at least one decoy service.

An effect is that intrusions into a vehicular network can be classified with a high degree of confidence without requiring existing components of a vehicular communications network (such as a routing manager) to perform computationally expensive security monitoring tasks. Furthermore, this approach can be easily provided as a retrofit solution to existing vehicle communications networks because it requires no alteration or software updating of existing vehicle communication middleware. Furthermore, the decoy detection can be performed, in some cases, outside of a vehicular network, such as at an edge node. Providing a rich selection of decoy services may enable behavioural insights concerning the actions of the external intruder.

According to a second aspect, the present invention provides an apparatus for detecting anomalous communications in a service oriented communication system. According to an example embodiment of the present invention, the apparatus comprises a communications interface and a processing unit.

The processing unit is configured to execute a program to provide a decoy server communicably coupled to a service oriented communication system via the communications interface, wherein the decoy server is configured to host at least one decoy service, wherein the at least one decoy service is addressable using a corresponding decoy service identifier.

The decoy server, when executed by the processor, is configured to detect a request to consume at least one instance of the at least one decoy service, wherein the request originates from a client communicably coupled to the decoy server via the service oriented communication system. The decoy server, when executed by the processor, is configured to perform a response to the request to consume the at least one instance of the at least one decoy service.

According to a third aspect, the present invention provides a vehicle. According to an example embodiment of the present invention, the vehicle comprises an apparatus unit according to the second aspect, an in-vehicle communications network supporting a service oriented communication system, an intrusion detection server, and at least one electronic control unit. The processing unit is configured to execute a program to provide a decoy server communicably coupled to the in-vehicle communications network supporting a service oriented communication system, and to detect, at the decoy server, a request to consume at least one instance of the at least one decoy service, wherein the request originates from the at least one electronic control unit, and optionally transmit an intrusion alert to the intrusion detection server.

According to a fourth aspect, the present invention provides a computer program element comprising machine readable instructions which, when executed by a computer processor, perform the computer-implemented method according to the first aspect, or its embodiments.

According to a fifth aspect, the present invention provides a computer readable medium comprising the computer program element according to the fourth aspect.

BRIEF DESCRIPTION OF THE DRAWINGS

Exemplary embodiments of the present invention are depicted in the figures, which are not to be construed as limiting the present invention, and are explained in greater detail below.

DETAILED DESCRIPTION OF EXAMPLE EMBODIMENTS

Service-oriented vehicle communication systems are more flexible and reconfigurable in comparison to previously developed in-vehicle communications, such as CAN-BUS. SOME/IP is middleware that uses parts of the TCP and UDP protocol to provide service oriented communication. A service-oriented architecture (SOA) is an architectural model of communication. It defines interactions between a service provider (service) and a service user (client). In a security scenario, one or more service users or clients may be considered to be a security risk. For example, a client may be assumed to attempt to access various ECUs to obtain confidential information stored on the ECUs, or to change an end effector operably coupled to the ECU.

In a SOA, the interaction between service and client can occur according to the following model. Firstly, a service provider (such as an ECU, or group of ECUs) publishes, or registers, the service or services being offered. Secondly, a software component of a client searches for the service. For example, a centralised register of services may be maintained in a component such as a routing manager 24. Alternatively, or in addition, each client or other service may maintain distributed registers of published services. When a client finds the appropriate service, the client obtains a reference, or address, at which it may obtain the service. A function call of a remote procedure call operating in the client may be referenced by this address, for example. The service may then be accessed. Input values are sent to the service of choice, and output parameters may be returned from the service of choice.

The SOME/IP protocol implements service discovery without a central directory of services, using the "publish/subscribe" model. One or more services announce (publish) their services via multicast on the vehicle network. Service users monitor the vehicle network for multicast messages advertising services, and subscribe to the services those service users require an attribute that can be provided by one or more of the advertised services. A service user may also use service discovery mechanisms such as the SOME/IP "FIND" communication to find the details of a service that should be present, for example, and to configure access to the service.

Figure 1:
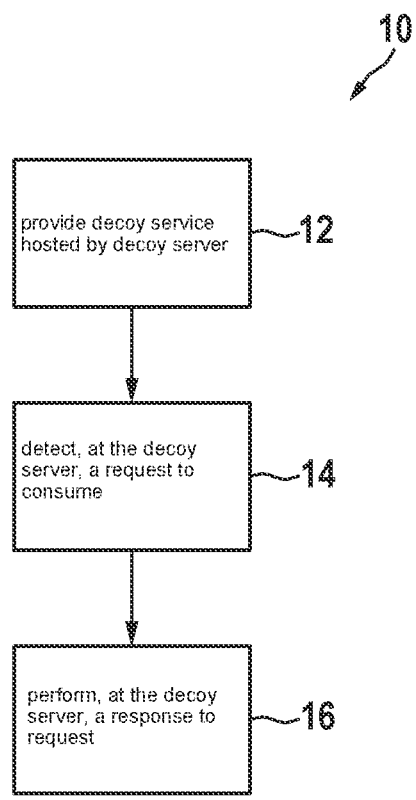
FIG. 1 schematically illustrates a computer-implemented method according to the first aspect of the present invention.
Figure 2:
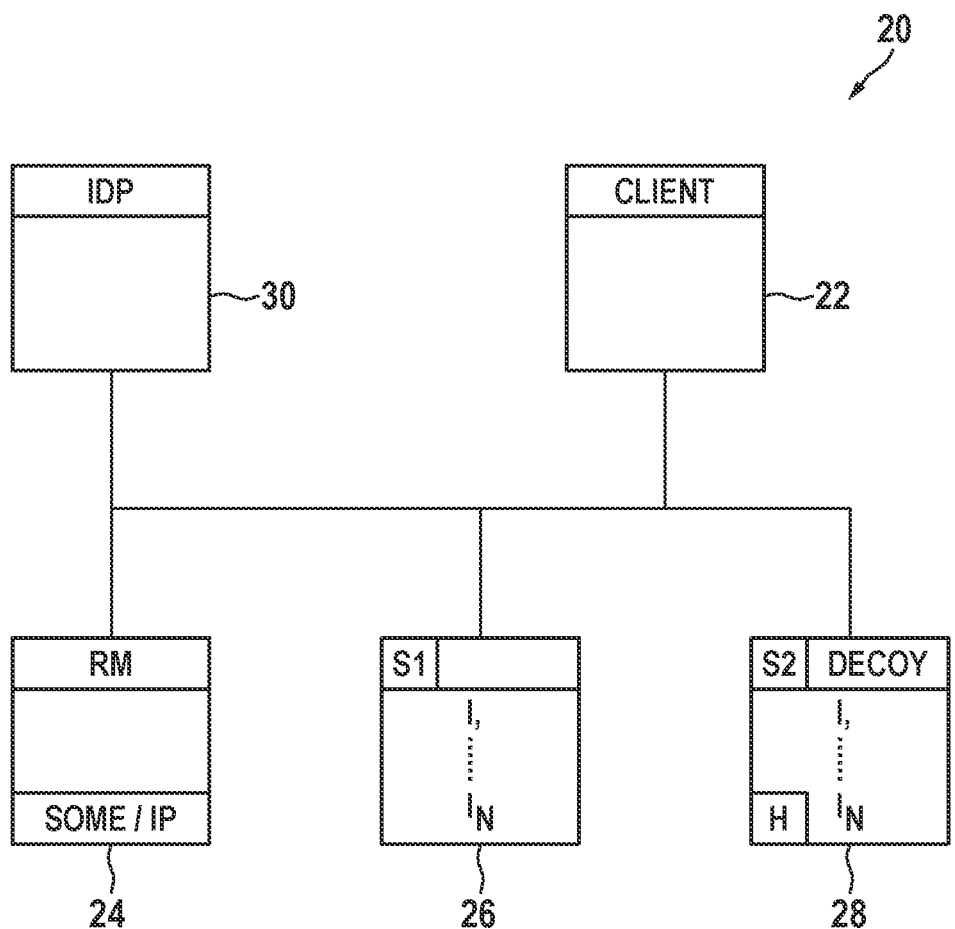
FIG. 2 schematically illustrates a service-oriented communication system, according to an example embodiment of the present invention.

FIG. 2 schematically illustrates a service-oriented communication system 20.

The service-oriented communications system may, for example, be comprised within a vehicle. A vehicle communications network 32 comprising Ethernet enables a plurality of Electronic Control Units (ECUs) to communicate with each other. In this simplified example, an ECU 26 that is logically coupled to the vehicle communications network 32 functions as an uncompromised server offering one or more services I1-IN. A decoy ECU 28 (server) that is logically coupled to the vehicle communications network 32 offers one or more decoy services I1-IN. A routing manager 24 may act as middleware for the implementation of a service-oriented communications protocol. In one example, the service-oriented communications protocol is SOME/IP. An intrusion detection and prevention ECU (server) 30 is logically coupled to the vehicle communications network 32. A client 22 is logically coupled to the vehicle communications network 32. For the purposes of this specification, it is assumed that the client 22 may be controlled by an intruder. For example, the client 22 may harbour malware.

A major feature of SOME/IP is its capability to alter the network and communication structure at run-time. SOME/IP has mechanisms for dynamically configuring what data is sent to which ECU (via the publish/subscribe mechanism). SOME/IP-SD (Service Discovery) enables ECUs to find functionality offered by ECUs dynamically, and to configure access to it.

In an embodiment, the tasks of managing the publish/subscribe mechanism and service discovery are performed by the SOME/IP routing manager 24. The SOME/IP routing manager 24 is configured to track which ECUs (servers) offer what services, and where the data emitted from the services should be transmitted (i.e., which ECUs or clients can receive the data). In this specification, it should be noted that in accordance with the SOME/IP specification, a specific ECU can perform the function of a client and a server simultaneously or at different times. For example, ECU 26 may consume data offered by another service, and offer data to other ECUs connected to the vehicle communications network 32.

For example, an ECU 26 can offer a service by dynamically supplying a "service_ID" and an "instance_ID" identifying the service to the routing manager 24. As a result, the routing manager 24 may advertise the newly offered service to other members of the vehicle communications network 32, optionally via the publish/subscribe protocol. Alternatively, the ECU 26 can offer a service by multicasting the "service_ID" and an "instance_ID" to the other members of the vehicle communications network 32, with each member of the vehicle communications network 32 keeping a record of the services offered. In other words, in some implementations the routing manager 24 is not essential.

In this context, there arises the problem of how reconnaissance attacks originating at the hostile client 22 can be detected within the SOME/IP without causing a performance penalty to the vehicle communications network 32, or any of its other members, when processing SOME/IP requests.

Existing intrusion detection approaches in the automotive domain are based on a "whitelisting" approach. The "whitelist" defines every permitted communication interaction within the monitored system. For example, legitimate IDs of messages in a particular in-vehicle network segment or the expected range of intervals for a periodically repeating message pattern. A challenge of such systems is how to classify observed anomalies. If a message expected to arrive with a period of 150 ms is, instead, arriving with a period of 120 ms, it can be difficult to discriminate between an intrusion, or another phenomenon such as a software update of a component in the monitored address range.

According to a first aspect, there is provided a computer-implemented method 10 for detecting anomalous communications in a service oriented communication system 20 comprising:

providing 12 at least one decoy service, hosted by a decoy server 28 communicably coupled to the service oriented communication system 20, wherein the at least one decoy service is addressable using a corresponding decoy service identifier;

detecting 14, at the decoy server 28, a request to consume at least one instance of the at least one decoy service, wherein the request originates from a client 22 communicably coupled to the decoy server 28 via the service oriented communication system 20; and performing 16, at the decoy server 28, a response to the request to consume the at least one instance of the at least one decoy service.

SOME/IP's "publish/subscribe" mechanism allows the addition, reconfiguration, or deletion of services. In the context of a vehicle, different services could be offered based on the location, or technical context of the vehicle. As one example, in a situation when the vehicle is detected to be in a static, parked configuration, communication interface services useful for car servicing (specifically the OBD-II communication gateway) can be offered. Otherwise, that gateway would not be offered on the vehicle communications network 32. SOME/IP-SD (service discovery) enables the discovery of previously unknown services, for example, by a potential client of a service issuing a "FIND(service_id)" request to the vehicle communications network 32.

It may be assumed that an external attacker via client 22 will have incomplete knowledge of the topology of the vehicle communications network 32. The external attacker would need to use client 22 to perform reconnaissance within the vehicle communications network 32 to determine a set of (service_id, instance_id) pairs.

According to the first aspect, decoy server 28 offers a decoy service to the vehicle communications network 32. As the external attacker uses client 22 to reconnoitre the vehicle communications network 32 (by trying to discover (service_id, instance_id) pairs), the decoy service on the decoy server 28 will eventually be discovered and contacted by the client 22. At this point, the decoy server 28 may perform a response to being contacted, or accessed, by the client 22. In an embodiment, the decoy service offered by the decoy server 28 is not configured to be accessed by any other member of the vehicle communications network 32. Accordingly, any attempt by a member of the vehicle communications network 32 to communicate with a service offered by the decoy server 28 is, de facto, an intrusion attempt. In other words, one or more decoy services can be added to a SOME/IP network that behave, on the SOME/IP network, as if they were legitimate services, but are actually mocked out by, for example, simple script-based logic.

In an example, the decoy server 28 may host the decoy service on a standalone ECU. In another example, the decoy server 28 may host the decoy service as a secure, and/or virtualized partition of another ECU on the vehicle communications network 32. In an example, the decoy server 28 may be located at a remote location, such as an edge server, that is accessible via a communications gateway of the vehicle communications network 32. Therefore, the decoy service would be accessible from the vehicle at a remote location.

In an embodiment, a predefined response action is generated in response to the decoy service offered by decoy server 28 receiving an interaction from the client 22. In an example, a reaction may be to monitor the IP address of the external party communicating via client 22 into a "sin bin", and to ignore any further SOME/IP requests from that external IP address. Alternatively, or in addition, the decoy server 28 may allow the decoy service (such as a fake application script running in the decoy server 28) to be successfully hacked by the external intruder via client 22. Optionally, the fact of the intrusion could be reported to an in-vehicle intrusion and detection instance 30. This enables an investigation of what actions the internal intruder is taking, as forensic evidence to uncover previous unknown attacks to other vehicles.

Referring to FIG. 2, Service 26 is a legitimate SOME/IP service (for example, a tachometer service) that may be consumed in a standard way. Service 26 may publish to the vehicle communications network 32, and/or the routing manager 24, the fact that it is offering instances of a tachometer service. Other members of the vehicle communications network 32 (not shown) may subscribe to the tachometer service via the publish/subscribe, or "FIND" mechanism of the SOME/IP-SD protocol.

From the perspective of the routing manager 24, the decoy service 28 can be offered and consumed in the same way as a standard service. In other words, the routing manager 24 does not need to perform any additional security checks, or verification, of incoming SOME/IP requests. It can function normally. This approach does not add computational overhead to the SOME/IP components of the middleware. The overhead is handled by a decoy server 28 in logical communication with the vehicle communications network 32. The decoy server 28 may be configured such that can more efficiently perform security-related tasks.

If the decoy service is used, it can be decided with a high degree of confidence that an intrusion is taking place, without increasing the computational load on the routing manager 24. Therefore, a lower false positive rate can be provided. The computational cost of performing intrusion detection is shifted to another ECU within the vehicle communications network 32. Optionally, if a "stub" ECU is provided as the decoy server containing a gateway, the intrusion detection can be performed away from the vehicle.

Furthermore, this approach can be easily provided as a retrofit solution to existing vehicle communications networks because it requires no alteration or software updating of existing vehicle communication middleware.

Figure 3:
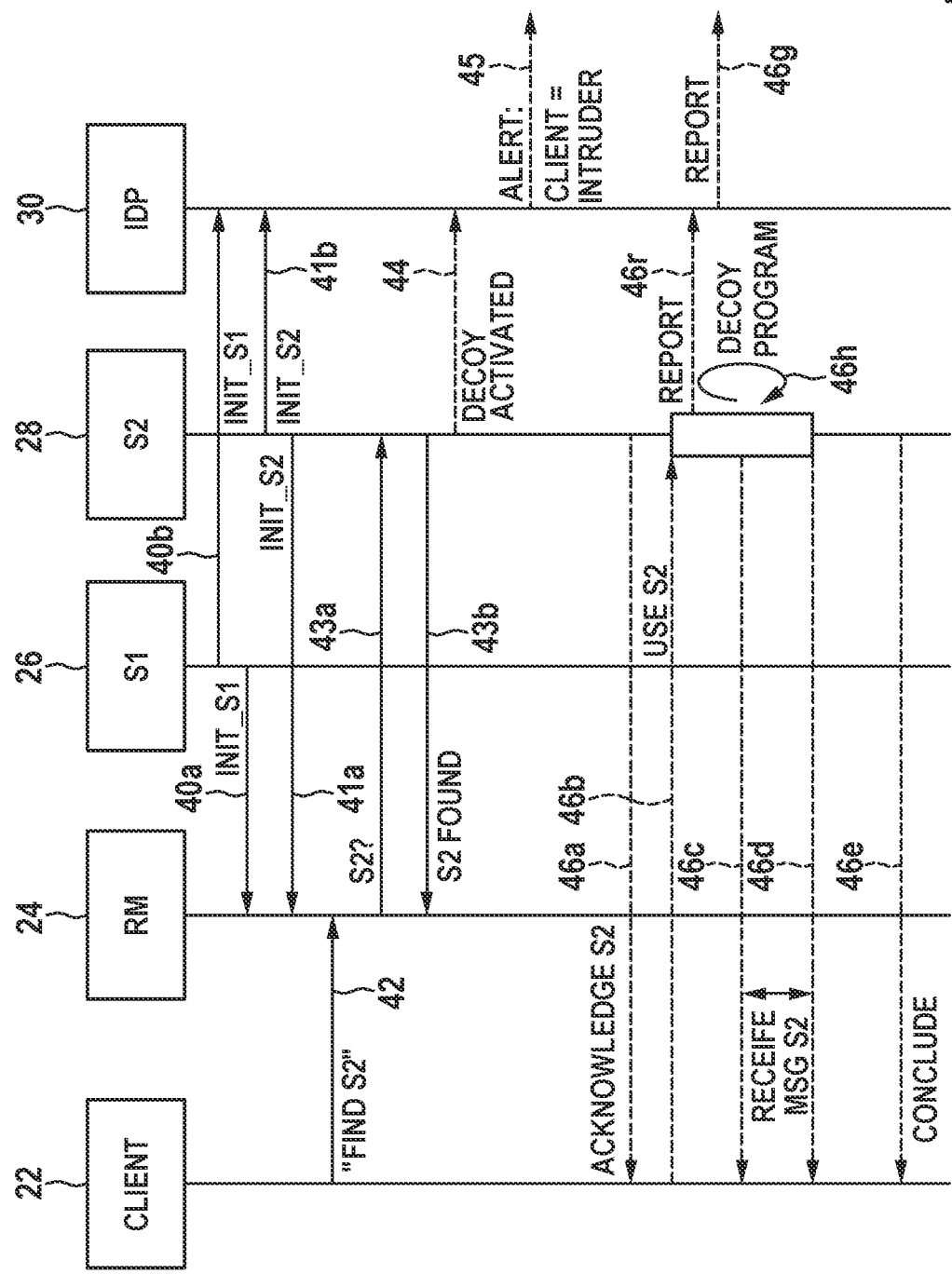
FIG. 3 schematically illustrates a communications process on a service-oriented communication system, according to an example embodiment of the present invention.

FIG. 3 schematically illustrates a communications process on a service-oriented communication system. A directed arrow represents a message, such as a SOME/IP message, TCP packet, or UDP packet being transmitted between elements of the vehicle communications network 32. It will be appreciated that the communication interaction in FIG. 3 comprises what may be considered to be several sub-processes, and performance of all steps of FIG. 3 is not essential.

Figure 4:
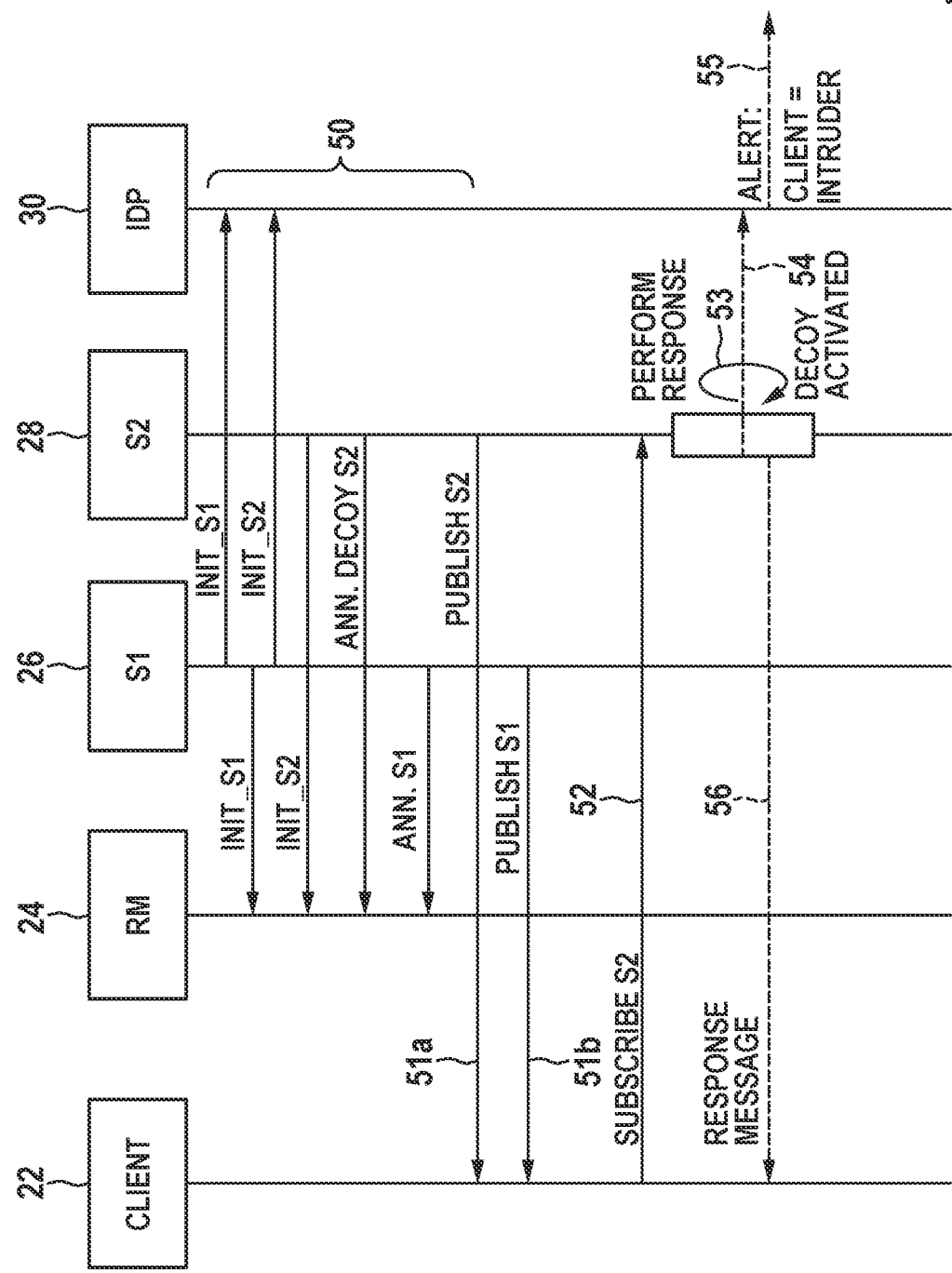
FIG. 4 schematically illustrates another communications process on a service-oriented communication system, according to an example embodiment of the present invention.
Figure 5:
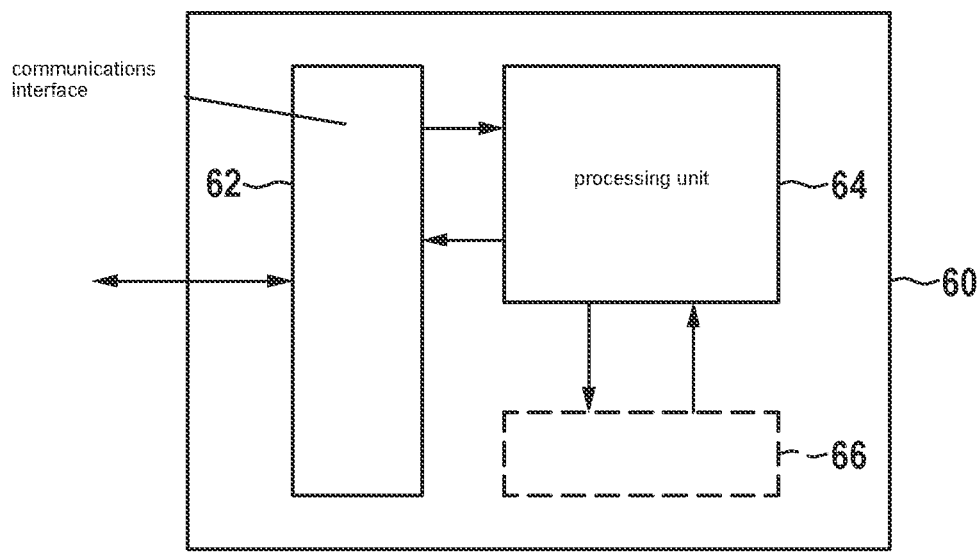
FIG. 5 schematically illustrates an apparatus according to the second aspect of the present invention.

FIG. 4 schematically illustrates another communications process on a service-oriented communication system. It will be appreciated that the communication interaction in FIG. 3 comprises what may be considered to be several sub-processes, and performance of all steps of FIG. 3 is not essential.

According to an embodiment, the method 10 further comprises:
  publishing, from the decoy server 28, at least one decoy service offer 51a identifying the decoy service hosted by the decoy server 28, wherein the decoy service offer is communicated via the service oriented communication system and wherein the decoy service offer is identifiable using a corresponding decoy service identifier "PublishS2"; and
  subscribing 52, at the client 22, to the at least one decoy service offer using the decoy service identifier comprised in the decoy service offer, and
  performing 53, at the decoy service, the response to the request to consume the at least one decoy service in response to the client subscribing to the offered decoy service.

In FIG. 4, a publish phase 50 occurs when server 26 and decoy server 28 send initialization messages "INIT_S1" and "INIT_S2" to the routing manager 24. Furthermore, the server 26 sends a "ANN.S1" messages announcing its offered services. The decoy server 28 sends a "ANN.DecoyS2" signal to the routing manager 24 announcing the offered decoy services. To the routing manager 24, there is no qualitative difference between "ANN.S1" and "ANN.DecoyS2". Either the routing manager 24, or the individual servers 26, 28, send "publishS1" and "publishS2" messages 51a, 51b to other members of the vehicle communication network 32 to advertise the availability of their services. These are received by client 22. The client 22 sends 52 a "subscribeS2" message to the decoy server 28, requesting use of an instance of the "ANN.DecoyS2" service. The "subscribeS2" message may be sent directly from the client 22 to the decoy server 28, or via the routing manager 24. Alternatively, the "subscribeS2" message may be sent directly from the client 22 to the decoy server 28, with the routing manager 24 observing and logging the connection.

When the decoy server 28 receives the "subscribeS2" message, the decoy server 28 performs a response 53 which will be detailed subsequently. However, the act that the decoy server 28 has received a request to consume the at least one decoy service in response to the client subscribing to the offered decoy service alerts the decoy server 28 to the presence of an intruder, and the network address of the client 22.

According to an embodiment, the method 10 further comprises:
  receiving, at the decoy server 28, a "find" message transmitted 43a via the service oriented communication system from the client 22, wherein the find message comprises the decoy service identifier; and
  offering 46a, from the decoy server, the at least one decoy service identified by the decoy service identifier;
  subscribing, at the client 22, to the at least one decoy service offer 46a using the decoy service identifier comprised in the decoy service offer, and
  performing, at the decoy server 28, the response to the request to consume the at least one decoy service in response to the client 22 subscribing to the offered decoy service.

Alternatively, as set out in FIG. 3, following an initialization phase involving the server 26 and the decoy server 28 registering their services at the routing manager 26 via the messages "Init_S1" and "Init_S2", the client 22 issues a "FIND S2" message to the routing manager 24. In one example, the intruder controlling the client 22 has no knowledge of the identifier "S2", and is probing the routing manager for successful server addresses in a manner reminiscent of TCP/IP "port scanning". Alternatively, the intruder controlling the client 22 may have some knowledge of common server names. The decoy server 28 could be provided with one or more service names concerning legacy services that are no longer in active use in production vehicles. The decoy server 28 could publish (for example, to the routing manager) such services based on the legacy identifiers, making it more likely that the client 22 would attempt to access a named legacy service using a "FIND" request to the routing manager 24.

In FIG. 4, the "FINDS2" message is forwarded 43a from routing manager 24, to the decoy server 28. The decoy server 28 forwards a "found" message to the routing manager 24. Optionally, the decoy server 28 can acknowledge the "FIND" signal with an "ACKNOWLEDGE S2" transmitted 46a from the decoy server 28 to the client 22, but this is not essential.

When the decoy server 28 receives the "FIND S2" message, the decoy server 28 performs a response 53 which will be detailed subsequently. However, the act that the decoy server 28 has received a request from the client 22 searching for the at least one decoy service the decoy server 28 to the presence of an intruder, and the network address of the client 22.

According to an embodiment, the response to the request to consume the at least one decoy service further comprises:
  transmitting, from the decoy server 28, an intrusion alert 44 to an intrusion detection service 30 notifying the intrusion detection service 30 that the at least one decoy service has received a request 43a to consume at least one instance of the at least one decoy service.

The decoy server 28 alerts the intrusion detection server 30 via a message 44 that an instance of a service offered by the decoy server 28 has been accessed.

According to an embodiment, the response to the request to consume the at least one decoy service further comprises:
  executing, at the decoy server 28, an application script based on at least one argument comprised in the request 43a to consume at least one instance of the at least one decoy service; and responding, to the client 22, with at least one output of the executed application script.

For example, the decoy server 28 mas send an "ACKNOWLEDGE S2" message 46a back to the client 22. An external intruder may, via, the client 22, attempt to interact with the service instance offered as a decoy service by the decoy server 28. For example, the decoy server 28 may host a decoy program 46h that may be engineered to present easily exploitable attack interfaces to an external intruder. Of course, the decoy server 28 will be firewalled from the remainder of the vehicle communication network 32 to ensure that such engineered interfaces do not become an attack surface, in themselves.

The decoy service may be simple, or complex. For example, the decoy program may emulate the interface of one or more common sensors on a vehicle such as a GPS sensor, a tachometer, and the like. Alternatively, the decoy service may emulate a program that contains fake personal data. For example, the decoy service may emulate an e-wallet or an address contacts book. This enables a security analyst to distinguish whether the external intruder is trying to obtain operational information directly related to the vehicle, or to commit identity theft, for example. In an example, the decoy service may appear to be an engine control function. If a decoy of a conventional engine control function is manipulated by an external attacker, this enables identification of the attacker as trying to control the vehicle itself, for example.

According to an embodiment, the method 10 further comprises:

transmitting, from the decoy server 28 to the intrusion detection service 30, an indication of the execution path of the application script, and/or the at least one input argument comprised in the request to consume at least one instance of the at least one decoy service.

The intrusion detection server 30 can transmit a message 45 alerting an external entity that the decoy server 28 has been interacted with unexpectedly. This may be a logical flag and/or timestamp denoting the presence of an intrusion. The intrusion detection server 30 may update a native database of intrusion attempts. The intrusion detection server 30 may communicate details about the intrusion, via a communications gateway of the vehicle (such as a GSM/LTE telecommunications network connection), to a central database of a security operations centre of the OEM. Optionally, the message 45 may contain a trace of the execution of a dummy script inside the decoy server 28. Optionally, a plurality of messages 45 may be sent from the intrusion detection server 30, enabling real-time observation of the attack in progress.

During the emulated decoy service interaction, the decoy server may issue and receive messages 46*c*, 46*d*, and even conclude the use of the decoy service with a "CONCLUDE" message 46*e*, so that the external attacker is not alerted to the fact that they have been interacting with a decoy service and/or decoy program 46*h*. A digest of the interactions with the decoy program, such as code coverage, or the triggering of specific break points, can be reported as a message 46*f* to the intrusion detection server 30, and then, via a gateway, to an external entity such as a security monitoring centre of the OEM.

According to an embodiment, the intrusion detection service is an in-vehicle intrusion detection service hosted by an in-vehicle intrusion detection server, and/or a remote intrusion detection service accessible through a communication gateway.

The intrusion detection server 30 may be logically connected to a vehicle communications network 32, to enable the vehicle itself to have knowledge that an attack may be in progress. This enables the vehicle to take automatic action in the absence of an external communications connection to a security operations centre of the OEM. For example, if the decoy service offered by the decoy server 28 indicates that the external intruder is attempting to interfere with decoy components that could be associated with a drivetrain, braking, or steering function of a vehicle via the client 22, the driver of the vehicle could be alerted by the intrusion detection server 30 and told to pull aside immediately, or not to begin driving, via a dashboard alert. In an embodiment, the intrusion detection server 30 locks the vehicle so that it cannot be driven, in response to receiving a message reporting an attack on the decoy server 28.

According to an embodiment, the at least one decoy service is configured to mimic a service offered by an electronic control unit, a vehicular telematics service, an engine control unit, a vehicle to vehicle communication module, a vehicle infotainment system, an antilock braking system, a navigation system, a transmission control unit, a keyless entry module, an airbag control unit, an OBD-II communication gateway, an anti-theft system, or a USB or serial gateway.

The decoy server 28 may offer services related to one, or a combination, of the listed components (without limitation). In an embodiment, the decoy server 28 may emulate a SOME/IP routing manager. The ability to emulate so many different items means that a behavioural profile of the external intruder can be built up, based on how the intruder interacts with the offered decoy services.

According to an embodiment, the method 10 further comprises:

obtaining, at the decoy server 28, from a further service hosted by a further server communicably coupled to the service oriented communication system 20, at least one parameter measured by the further server; and wherein the response to the request to consume the at least one instance of the at least one decoy service comprises providing to the client 22, as response data, event data, or field data, of the at least one parameter measured by the further server, and optionally wherein the at least one parameter measured by the further server comprises at least one of GPS coordinates of a vehicle, vehicle velocity, braking or gear status of a vehicle, or the status of a vehicle infotainment system.

The decoy server 28 may also act as a decoy client, and itself consume services offered to the vehicle communications network 32. For example, the decoy service offered by the decoy server 28 may be a decoy dashboard display program, which would require tachometer information from a tachometer service instance offered by a tachometer ECU server, in order to present a plausible decoy of a dashboard display to the attacker. In fact, the decoy server 28 may subscribe to one, or a plurality of other services offered to the vehicle communications network 32 in order to provide a plausible decoy program. In an embodiment, the decoy server 28 is restricted from performing remote procedure calls or other control actions on other servers connected to the vehicle communications network 32.

According to an embodiment, the method 10 further comprises:

changing the version of the at least one decoy service, and/or providing at least one further decoy service on a further decoy server, based on a determination of the use context of a vehicle comprising the service oriented communications system, wherein the use context is optionally determined according to one or more of the time of day, a geographical position of the vehicle, a driving status of the vehicle, or the connection to the vehicle of a OBD-II communication gateway, a USB gateway, or the activation of a wireless communication gateway.

External intruders may interact with the decoy server 28 differently based on its use context. Accordingly, the decoy server 28 may comprise a daemon capable of identifying which "use mode" a vehicle is in. The decoy services offered by the decoy server 28 may be adjusted based on the identified "use mode". For example, a "use mode" could be "vehicle parked on driveway", "vehicle charging at home", "vehicle being serviced", "vehicle parked in insecure car park", "vehicle parked in secure car park", "vehicle driving in heavy traffic", "vehicle driving in light traffic", and the like.

According to an embodiment, the service oriented communication system uses the "SOME/IP" protocol, and/or wherein a "SOME/IP" routing manager communicably coupled to the service oriented communication system does not perform additional anomalous communication checks for communications relating to the at least one decoy service.

According to a second aspect, there is provided an apparatus 60 for detecting anomalous communications in a service oriented communication system comprising a communications interface 62, and a processing unit 64. The processing unit 64 is configured to execute a program to provide a decoy server 28 communicably coupled to a service oriented communication system 20 via the communications interface 62, wherein the decoy server 28 is configured to host at least one decoy service, wherein the at least one decoy service is addressable using a corresponding decoy service identifier. The decoy server 28, when executed by the processing unit 64, is configured to detect a request to consume at least one instance of the at least one decoy service, wherein the request originates from a client communicably coupled to the decoy server via the service oriented communication system. The decoy server 28, when executed by the processor 64, is configured to perform a response to the request to consume the at least one instance of the at least one decoy service.

The apparatus 60 may, for example, be implemented on an embedded computer capable of convincingly executing the decoy services discussed herein. Simply decoy services (such as those performing a basic "tripwire" function can be implemented using a microcontroller having relatively low computational ability. More advanced decoy services involving emulating an infotainment system, for example, may require an embedded computer having the performance of an in-vehicle infotainment computer.

According to a third aspect, there is provided a vehicle comprising an apparatus 60 according to the second aspect, an in-vehicle communications network 32 supporting a service oriented communication system, an intrusion detection server 30, and at least one electronic control unit 22. The processing unit 64 of the apparatus 60 is configured to execute a program to provide a decoy server 28 communicably coupled to the in-vehicle communications network 32 supporting a service oriented communication system, and to detect, at the decoy server 28, a request to consume at least one instance of the at least one decoy service, wherein the request originates from the at least one electronic control unit 22, and optionally transmit an intrusion alert to the intrusion detection server 30.

According to a fourth aspect, there is provided a computer program element comprising machine readable instructions which, when executed by a computer processor, perform the computer-implemented method according to the first aspect or its embodiments.

According to a fifth aspect, there is provided a computer readable medium comprising computer program element of the fourth aspect.

The computer readable medium is configured to store a computer program, application, logic including machine code capable of being executed by a processor. The computer readable medium includes RAM, ROM, EEPROM, and other devices that store information that may be used by the processor. In examples, the processor and the computer readable medium are integrated on the same silicon die, or in the same packaging. In examples, the computer readable medium is a hard disc drive, solid state storage device, or the like. In an example, the signal may be communicated over a data communication network such as the Internet as a download, or software update, for example.

The examples provided in the drawings and described in the foregoing written description are intended for providing an understanding of the principles of this specification. No limitation to the scope of present invention is intended thereby. The present specification describes alterations and modifications to the illustrated examples. Only the preferred examples have been presented, and all changes, modifications, and further applications to these within the scope of the specification are desired to be protected.

What is claimed is:

1. A computer-implemented method for detecting anomalous communications in a service oriented communication system, comprising the following steps:
   providing at least one decoy service, hosted by a decoy server communicably coupled to the service oriented communication system, wherein the at least one decoy service is addressable using a corresponding decoy service identifier;
   detecting, at the decoy server, a request to consume at least one instance of the at least one decoy service, wherein the request originates from a client communicably coupled to the decoy server via the service oriented communication system; and
   performing, at the decoy server, a response to the request to consume the at least one instance of the at least one decoy service.

2. The computer-implemented method according to claim 1, further comprising the following steps:
   publishing, from the decoy server, at least one decoy service offer identifying the decoy service hosted by the decoy server, wherein the decoy service offer is communicated via the service oriented communication system and wherein the decoy service offer is identifiable using a corresponding decoy service identifier; and
   subscribing, at the client, to the at least one decoy service offer using the decoy service identifier comprised in the decoy service offer; and
   performing, at the decoy service, the response to the request to consume the at least one decoy service in response to the client subscribing to the offered decoy service.

3. The computer-implemented method according to claim 1, further comprising:
   receiving, at the decoy server, a "find" message transmitted via the service oriented communication system from the client, wherein the find message includes the decoy service identifier; and
   offering, from the decoy server, the at least one decoy service identified by the decoy service identifier;
   subscribing, at the client, to the at least one decoy service offer using the decoy service identifier included in the decoy service offer; and
   performing, at the decoy server, the response to the request to consume the at least one decoy service in response to the client subscribing to the offered decoy service.

4. The computer-implemented method according to claim 1, wherein the response to the request to consume the at least one decoy service includes:
transmitting, from the decoy server, an intrusion alert to an intrusion detection service notifying the intrusion detection service that the at least one decoy service has received a request to consume at least one instance of the at least one decoy service.

5. The computer-implemented method according to claim 1, wherein the response to the request to consume the at least one decoy service includes:
executing, at the decoy server, an application script based on at least one input argument included in the request to consume at least one instance of the at least one decoy service; and
responding, to the client, with at least one output of the executed application script.

6. The computer-implemented method according to claim 5, further comprising:
transmitting, from the decoy server to the intrusion detection service: (i) an indication of an execution path of the application script, and/or (ii) the at least one input argument comprised in the request to consume at least one instance of the at least one decoy service.

7. The computer-implemented method according to claim 5, wherein the intrusion detection service is an in-vehicle intrusion detection service hosted by an in-vehicle intrusion detection server, and/or a remote intrusion detection service accessible through a communication gateway.

8. The computer-implemented method according to claim 1, wherein the at least one decoy service is configured to mimic a service offered by at least one, or any combination, of an electronic control unit, a vehicular telematics service, an engine control unit, a vehicle to vehicle communication module, a vehicle infotainment system, an antilock braking system, a navigation system, a transmission control unit, a keyless entry module, an airbag control unit, an OBD-II communication gateway, an anti-theft system, a USB gateway, or serial gateway.

9. The computer-implemented method according to claim 1, further comprising:
obtaining, at the decoy server, from a further service hosted by a further server communicably coupled to the service oriented communication system, at least one parameter measured by the further server;
wherein the response to the request to consume the at least one instance of the at least one decoy service includes providing to the client, as response data, event data, or field data, of the at least one parameter measured by the further server, and wherein the at least one parameter measured by the further server comprises at least one of GPS coordinates of a vehicle, vehicle velocity, braking status of a vehicle or gear status of a vehicle, or status of a vehicle infotainment system.

10. The computer-implemented method according to claim 1, further comprising:
changing a version of the at least one decoy service, and/or providing at least one further decoy service on a further decoy server, based on a determination of a use context of a vehicle including the service oriented communications system, wherein the use context is determined according to one or more of: time of day, a geographical position of the vehicle, a driving status of the vehicle, a connection to the vehicle of a OBD-II communication gateway, a connection to the vehicle of a USB gateway, or activation of a wireless communication gateway.

11. The computer-implemented method according to claim 1, wherein the service oriented communication system uses a "SOME/IP" protocol, and/or wherein a "SOME/IP" routing manager communicably coupled to the service oriented communication system does not perform additional anomalous communication checks for communications relating to the at least one decoy service.

12. An apparatus configured to detect anomalous communications in a service oriented communication system, comprising:
a communications interface; and
a processing unit, wherein the processing unit is configured to execute a program to provide a decoy server communicably coupled to a service oriented communication system via the communications interface, wherein the decoy server is configured to host at least one decoy service, wherein the at least one decoy service is addressable using a corresponding decoy service identifier, wherein the decoy server, when executed by the processor, is configured to detect a request to consume at least one instance of the at least one decoy service, wherein the request originates from a client communicably coupled to the decoy server via the service oriented communication system, and wherein the decoy server, when executed by the processor, is configured to perform a response to the request to consume the at least one instance of the at least one decoy service.

13. A vehicle, comprising:
an apparatus configured to detect anomalous communications in a service oriented communication system, comprising:
a communications interface, and
a processing unit;
an in-vehicle communications network supporting a service oriented communication system;
an intrusion detection server; and
at least one electronic control unit;
wherein the apparatus is configured to execute a program to provide a decoy server communicably coupled to the in-vehicle communications network supporting a service oriented communication system, to detect, at the decoy server, a request to consume at least one instance of at least one decoy service of the decoy server, wherein the request originates from the at least one electronic control unit, and to transmit an intrusion alert to the intrusion detection server.

14. A non-transitory computer readable medium on which is stored a computer program for detecting anomalous communications in a service oriented communication system, the computer program, when executed by a computer processor, causing the computer processor to perform the following steps:
providing at least one decoy service, hosted by a decoy server communicably coupled to the service oriented communication system, wherein the at least one decoy service is addressable using a corresponding decoy service identifier;
detecting, at the decoy server, a request to consume at least one instance of the at least one decoy service, wherein the request originates from a client communicably coupled to the decoy server via the service oriented communication system; and performing, at the decoy server, a response to the request to consume the at least one instance of the at least one decoy service.

\* \* \* \* \*